United States Patent
Haskell et al.

(10) Patent No.: US 7,356,081 B1
(45) Date of Patent: *Apr. 8, 2008

(54) BIDIRECTIONALLY PREDICTED PICTURES OR VIDEO OBJECT PLANES FOR EFFICIENT AND FLEXIBLE VIDEO CODING

(75) Inventors: Barin Geoffry Haskell, Tinton Falls, NJ (US); Atul Puri, Riverdale, NY (US); Robert Louis Schmidt, Howell, NJ (US)

(73) Assignee: AT&T Corp., New York, NY (US)

( * ) Notice: Subject to any disclaimer, the term of this patent is extended or adjusted under 35 U.S.C. 154(b) by 898 days.

This patent is subject to a terminal disclaimer.

(21) Appl. No.: 10/728,658

(22) Filed: Dec. 6, 2003

Related U.S. Application Data

(63) Continuation of application No. 09/988,786, filed on Nov. 20, 2001, now Pat. No. 6,704,360, which is a continuation of application No. 08/827,142, filed on Mar. 27, 1997, now Pat. No. 6,404,813.

(51) Int. Cl.
  *H04N 7/12* (2006.01)
  *G06K 9/36* (2006.01)
(52) U.S. Cl. .................. 375/240.12; 382/236
(58) Field of Classification Search ........... 375/240.12, 375/240.15, 240.25, 240.16; 382/232, 236, 382/238; 348/409.1
See application file for complete search history.

(56) References Cited

U.S. PATENT DOCUMENTS

| | | | |
|---|---|---|---|
| 4,958,226 A | | 9/1990 | Haskell et al. |
| 5,408,328 A | * | 4/1995 | Boliek et al. ............... 358/433 |
| 5,414,469 A | * | 5/1995 | Gonzales et al. ........... 348/408 |
| 5,465,119 A | * | 11/1995 | Demos ....................... 348/447 |
| 5,467,136 A | * | 11/1995 | Odaka et al. ................ 348/416 |
| 5,488,418 A | * | 1/1996 | Mishima et al. ............ 348/398 |
| 5,532,747 A | * | 7/1996 | Yoon et al. .................. 348/416 |
| 5,539,468 A | * | 7/1996 | Suzuki et al. ............... 348/403 |
| 5,633,684 A | * | 5/1997 | Teranishi et al. ........... 348/398 |
| 5,699,117 A | * | 12/1997 | Uramoto et al. ............ 348/390 |

(Continued)

FOREIGN PATENT DOCUMENTS

EP        0 534 350        3/1993

OTHER PUBLICATIONS

A. Puri, et al., "Video Coding With Motion-Compensated Interpolation for CD-ROM Applications", Signal Processing: Image Communication 2 (1990); pp. 127-144.

(Continued)

*Primary Examiner*—Gims Philippe

(57) ABSTRACT

A method is provided for decoding a bit stream representing an image that has been encoded. The method includes the steps of: performing an entropy decoding of the bit stream to form a plurality of transform coefficients and a plurality of motion vectors; performing an inverse transformation on the plurality of transform coefficients to form a plurality of error blocks; determining a plurality of predicted blocks based on bidirectional motion estimation that employs the motion vectors, wherein the bidirectional motion estimation includes a direct prediction mode and a second prediction mode; and, adding the plurality of error blocks to the plurality of predicted blocks to form the image. The second prediction mode may include forward, backward, and interpolated prediction modes.

30 Claims, 8 Drawing Sheets

U.S. PATENT DOCUMENTS

| | | | | |
|---|---|---|---|---|
| 5,757,971 | A | * | 5/1998 | Kim .......................... 348/409 |
| 5,778,097 | A | | 7/1998 | Nickerson |
| 5,825,421 | A | * | 10/1998 | Tan ........................... 348/409 |
| 5,978,509 | A | | 11/1999 | Nachtergaele et al. |
| 5,991,447 | A | * | 11/1999 | Eifrig et al. ................ 382/236 |
| 6,005,980 | A | * | 12/1999 | Eifrig et al. ................ 386/236 |
| 6,043,846 | A | * | 3/2000 | Shen et al. ............. 348/409.1 |
| 6,057,884 | A | * | 5/2000 | Chen et al. ............ 375/240.16 |

OTHER PUBLICATIONS

H.G. Musmann, et al., "Advances in Picture Coding", Proceedings of the IEEE, vol. 73, No. 4, Apr. 1985; pp. 523-548.

"Video Coding for Low Bitrate Communication", International Telecommunication Union, Telecommunication Standardization Sector of ITU, Draft H.263, May 2, 1996.

Puri et al, "Initial B-Picture Syntax Proposal for MPEG-4 Video", Int'l Organisation for Standardization, Coding of Moving Pictures and Associated Audio, ISO/IEC JTC1/SC29/WG11/ MPEG 96/0776, Florence, Mar. 1996, EXHIBIT A.

Florence Press Release, Source: Leonard Chiariglione, "MPEG Press Release", Int'l Organisation for Standardisation, Coding of Moving Pictures and Audio, ISO/IEC JTC1/SC29/WG11N 1249, pp. 1-3, Mar. 1996, Firenze (Florence), EXHIBIT B.

Ad hoc group on MPEG-4 video VM editing, MPEG-4 Video Verification Model Version 2.1, Source: Video Group, Int'l Organisation for Standardisation, Coding of Moving Pictures and Associated Audio Information, ISO/IEC JTC1/SC29/WG11, XXXX, May 3, 1996, EXHBIT C.

Information Technology—Coding of Audio-Visual Objects—Part 2: Visual, Amendment 1: Visual Extensions; Int'l Organisation for Standardisation; Coding of Moving Pictures and Audio; ISO/IEC 14496-2: 1999/Amd.1:2000(E); ISO/EIC JTC 1/SC 29/WG 11; SC 29 Secretariat: JISC; Jan. 31, 2000; EXHIBIT D.

Schmidt et al, "Results of Scalability Experiments", Int'l Organisation for Standardization, Coding of Moving Pictures and Associated Audio, ISO/IEC JTC1/SC29/WG11, MPEG 96/1084, Jul. 1996, Tampere, EXHIBIT E.

Haskell, Barry G., et al., "MPEG-4 and the Future", Digital Video: An Introduction to MPEG-2, pp. 369-371 (1997).

* cited by examiner

BIDIRECTIONALLY PREDICTED PICTURES OR VIDEO OBJECT PLANES FOR EFFICIENT AND FLEXIBLE VIDEO CODING

This application is a continuation of U.S. patent application Ser. No. 09/988,786 filed on Nov. 20, 2001 now U.S. Pat. No. 6,704,360, which is a continuation of U.S. patent application Ser. No. 08/827,142, filed Mar. 27, 1997, now U.S. Pat. No. 6,404,813.

TECHNICAL FIELD

This invention relates to encoding and decoding of video signals. More particularly, this invention relates to encoding and decoding of video signals from very low to high bitrates.

BACKGROUND

Bidirectionally predicted pictures (B-pictures) were adopted for the International Standards Organization (ISO) Moving Picture Experts Group-Phase 1 (MPEG-1) video standard, which was optimized for coding of video signals of Source Intermediate Format (SIF: 352×240@ 30 frames/s or 352×288 @ 25 frames/s) at bitrates of up to about 1.5 Mbit/s. For the next phase of ISO MPEG, the MPEG-2 video standard, optimized for coding of CCIR-601 4:2:0 (active portion: 704×480 @ 30 interlaced frames/s or 704×576 @ 25 interlaced frames/s) at bit rates of 4 to 9 Mbits/s, B-pictures were again proven to provide high coding efficiency. Furthermore, in MPEG-2, the B-pictures were also adapted to achieve temporally scalable (layered) video coding, which is used for temporal scalability from interlace to high temporal resolution progressive video and compatible coding of stereoscopic video.

In addition to the ISO MPEG standards, the International Telecommunication Union-Transmission Sector (ITU-T) provides the H.263 standard. The H.263 standard is optimized for coding of Quarter Common Intermediate format (QCIF: 176×144 @ 30 frames/s or lower) vid o at very low bitrates of 20 to 30 kbits/s and includes a very low overhead (and a lower quality) version of B-pictures, called the PB-frame mode. Since the ITU-T H.263 standard deals with coding at lower bitrates of simple (e.g., video phone and video conferencing) scenes, the PB-frame mode was basically employed to double the frame-rate when higher temporal resolution was needed. The quality limitation of PB-frames was not considered to be a major impediment since it was the only efficient method to provide higher frame-rates. Furthermore, soon after completion of H.263, the ITU-T Low Bitrate Coding group started an effort to incorporate optional enhancements to H.263, which when combined with H.263 were expected to result in H.263+ standard. The work on these optional enhancements is being performed in parallel to the ongoing work in ISO on its next phase standard called MPEG-4.

The MPEG-4 standard is being optimized for coding of a number of formats, including QCIF, CIF, and SIF, at bitrates ranging from that employed for H.263 to that employed for MPEG-1, i.e., from about 20 kbits/s to about 1.5 Mbits/s. However, in MPEG-4, besides coding efficiency, the focus is on functionalities. Although MPEG-2 also provide some functionalities such as interactivity with stored bitstream (also provided in MPEG-1), scalability and error resilience, the bitrates used in MPEG-2 are much higher and its functionalities are rather limited. The goal of MPEG-4 is to allow a much higher degree of interactivity, in particular, interactivity with individual video objects in a stored bitstream, scalability, in particular, spatial and temporal scalability of individual objects, higher error resilience, and efficient coding of multiviewpoint video, all at bitrates ranging from very low to high. Further, it is anticipated that MPEG-4's current scope will be extended to include coding of interlaced video of Half Horizontal Resolution (HHR) and CCIR-601 optimized at higher bitrates (e.g., 2 to 6 Mbits/s) than those currently used. The video coding optimization work in MPEG-4 is being accomplished by iterative refinement of Verification Models (VMs) that describe the encoding schemes.

SUMMARY

Efficient coding of digital video is achieved in accordance with this invention, by integrating the bidirectional prediction modes of the MPEG-1 and the H.263 standards into a single adaptive scheme, while eliminating the restrictions and limitations imposed in these standards. This results in an efficient yet flexible method for performing the bidirectionally predictive coding of pictures (improved B-pictures) that is capable of efficiently operating with good performance over a wider range of bitrates than that possible by equivalent techniques in the individual MPEG-1 and H.263 standards. The present invention is thus suitable for B-picture coding of the H.263+ standard. Furthermore, the inventive method can be applied to the bidirectionally predictive coding of either rectangular regions or arbitrary shaped objects/regions in video pictures (so-called B-VOPs) for MPEG-4. The remaining portions of the regions are performed in accordance with the MPEG-1 or H.263 standard. That is, the motion compensated discrete cosine transform ("DCT") coding framework employed in existing standards such as MPEG-1, MPEG-2, and H.263 video standard is used, with appropriate extensions, to provide an efficient, flexible coding scheme.

Known encoding techniques are either effective at rates of 1 Mbit/s or higher (as in the case of B-pictures in MPEG-1/MPEG-2) or compromise quality if low bitrates are employed, (as in the case of PB-frames of the H.263 standard), or alternatively, are intended only on pictures (rectangular VOPs). In contrast, the inventive method allows effective operation over a wider range of bitrates and does not compromise quality anywhere within its operating range and is easily extensible to the encoding of arbitrary shaped objects in frames (VOPs or Video Object Planes). Moreover, to ensure high coding efficiency and quality, the prediction modes of the invention are combined with various types of overhead typically employed when coding blocks of pixels arranged as macroblocks. As a result, an optimized low-overhead coding syntax is provided that allows meaningful mode combinations. Thus, when coding pictures or rectangular VOPs the improved B-pictures of the invention provides compatibility with the remainder of the coding scheme by simply replacing the existing B-pictures with the improved B-pictures.

In one particular embodiment of the invention, a method is provided for decoding a bit stream representing an image that has been encoded. The method includes the steps of: performing an entropy decoding of the bit stream to form a plurality of transform coefficients and a plurality of motion vectors; performing an inverse transformation on the plurality of transform coefficients to form a plurality of error blocks; determining a plurality of predicted blocks based on bidirectional motion estimation that employs the motion vectors, wherein the bidirectional motion estimation includes a direct prediction mode and a second prediction mode; and, adding the plurality of error blocks to the plurality of predicted blocks to form the image. The second prediction mode may include forward, backward, and interpolated prediction modes.

DETAILED DESCRIPTION

The present invention addresses the issue of efficiently compressing digital video signals over a wide range of bitrates, ranging from very low bitrates of few tens of kbits/s to at least bitrates of few Mbit/s. Further, the invention functions in the context of the H.263+ and MPEG-4 video standards, which are currently being developed. These two standards are related to and based on the three existing standards, H.263, MPEG-1, and MPEG-2. While the invention is primarily directed to improved B-pictures, an additional issue that is addressed is efficient overhead syntax (which was presented to ITU-T LBC and MPEG committees) to enable the incorporation of the invention into the H.263+ and MPEG-4 standards. Furthermore, since the MPEG-4 video standards require the ability to handle arbitrary shaped VOPs, the invention ensures that it can be used not only on rectangular VOPs (similar to pictures) but also on arbitrary shaped VOPs (when such VOPs are coded bidirectionally).

Figure 1:
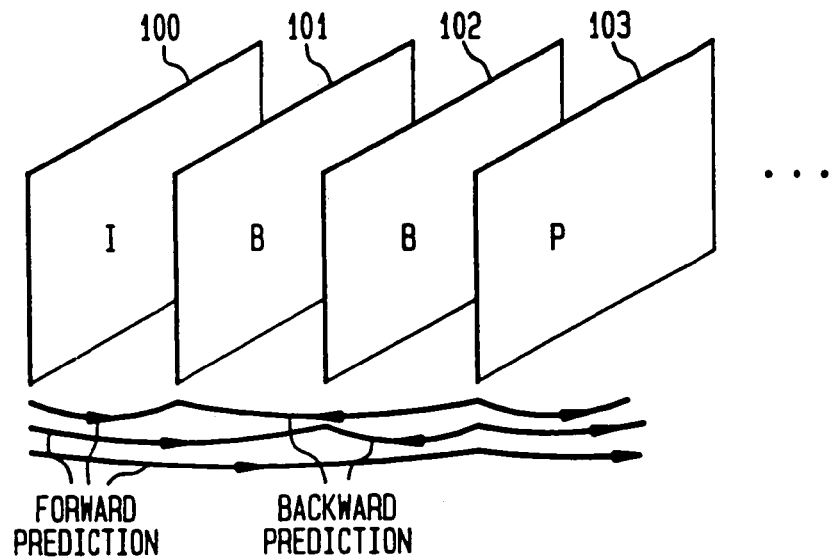
FIG. 1 shows an exemplary picture structure using I-, P- and B-pictures in accordance with the known MPEG-1 video standard.

FIG. 1 shows an exemplary picture structure composed of I, P and B-pictures in accordance with the known MPEG-1 and MPEG-2 standards. The first picture, 100, is coded as an I-picture and is used to predict picture 103, which is coded as a predictive (P-) picture. Following coding and decoding of picture 103, pictures 101 and 102 are coded bidirectionally (as B-pictures). For instance, picture 101 uses forward prediction with respect to decoded picture 100 and backward prediction with respect to decoded picture 103. Likewise, picture 102 also uses forward prediction with respect to decoded picture 100 and backward prediction with respect to decoded picture 103.

Figure 2:
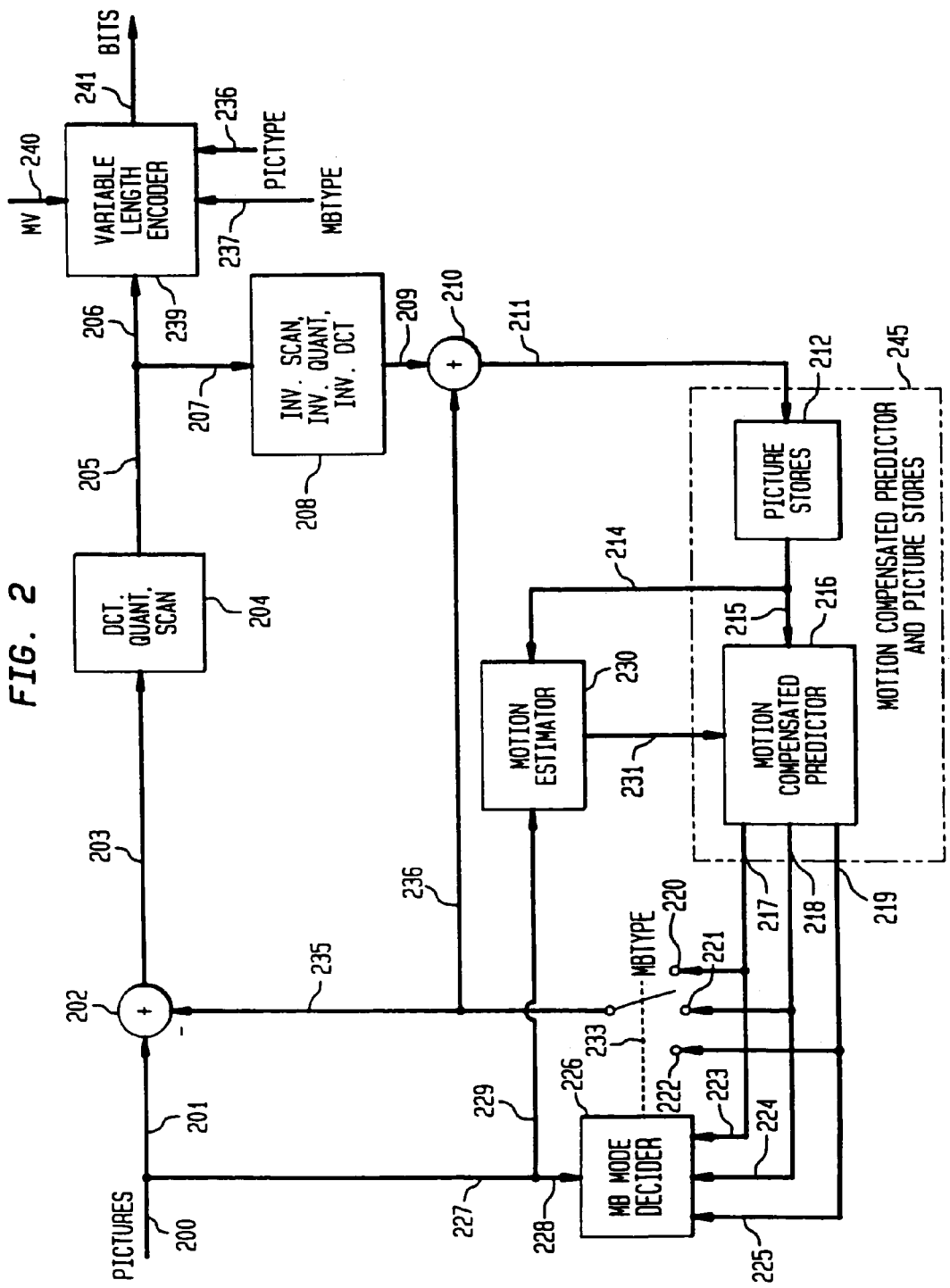
FIG. 2 shows a generalized block diagram of a Motion Compensated DCT Encoder in accordance with the known MPEG-1 video standard.

FIG. 2 shows a generalized block diagram of a motion compensated DCT Encoder in accordance with the known MPEG-1 (or H.263) video standard. Pictures to be coded are segmented to blocks and macroblocks and enter this encoder at line 200 and are sent over line 201 to a subtractor. At input 235 the corresponding prediction blocks are provided. The resulting prediction error is coded by DCT 204, in which a number of operations such as conversion of block of pixels to block of coefficients via DCT, quantization of these coefficients and scanning of quantized coefficient blocks takes place. The output of DCT 204 is available on line 205 and contains scanned coefficient (run, level) pairs readied for efficient entropy coding and are presented via line 206 to Variable Length Encoder 239, which also encodes motion vectors available on line 240, macroblock type (mbype) signal available on line 237 and picture type (pictype) on line 238 along with a few other identifiers (not shown for simplicity), to produce coded bitstream on line 241. The scanned (run, level) pairs of blocks of coefficients also enter the fedback path via line 207, which directs them to Inv. DCT 208 for inverse scan (Inv. Scan), inverse quantization (Inv. Quant) and inverse DCT (Inv. DCT), thus undoing the operations in DCT 204, except for quantization which is an inherently lossy procedure. To the decoded prediction error blocks output on line 209, the corresponding prediction blocks available on line 236 are added in adder 210, resulting in reconstructed blocks on line 211. These blocks (if the current picture being coded is not a B-picture) are stored in one of the two picture stores 212, which via line 214 form an input to Motion Estimator 230. The other input to Motion Estimator 230 is basically the blocks of the picture to be coded. Motion Estimator 230 generates motion vectors, which are provided on line 231 to Motion Compensated Predictor 216, which dependent on picture type or macroblock type, generates a number of prediction blocks. For instance in coding of B-pictures, three types of prediction blocks (or macroblocks) are generated: forward, backward and interpolated prediction on lines 217, 218 and 219, respectively. These blocks are also input to MB Mode Decider 226 via lines 223, 224 and 225, respectively, and to switch 232 via lines 220, 221 and 222 respectively. The output of MB Mode Decider 226 is a control signal on line 233, which controls the action of switch 232. For instance, the MB Mode Decider 226, determines which mode provides the best prediction and controls the switch to accept the corresponding macroblock for prediction, which passes over line 234 to line 235 and line 236. The encoder shown in FIG. 2 is assumed to use MPEG-1 B-pictures as one picture type, or more generally, picture structures such as those shown in FIG. 1.

Figure 3:
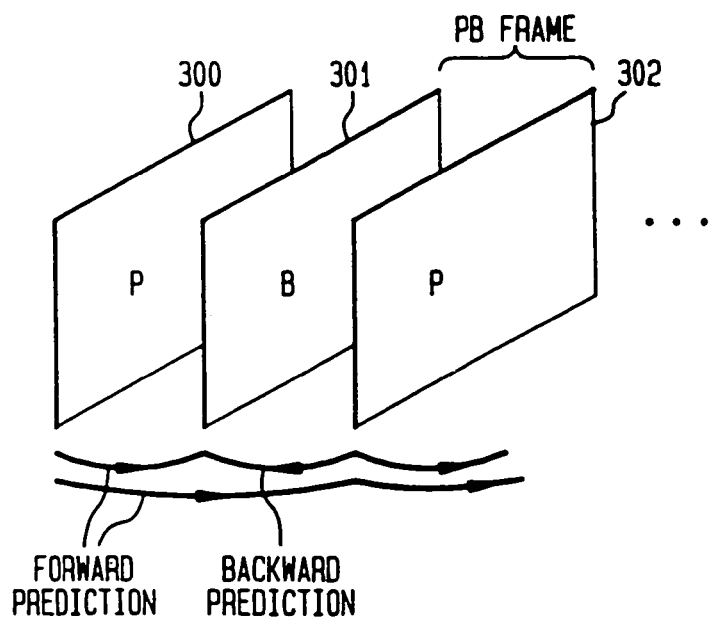
FIG. 3 shows an exemplary picture structure using P-pictures and PB-frames in accordance with the known H.263 standard.

FIG. 3 shows an exemplary picture structure using P-pictures and PB-frames in accordance with the known H.263 standard. It should be noted that although picture 300 is shown to be a P-picture, it is only a P-picture when it is not the first picture of the sequence, otherwise, it is an I-picture. Next, pictures 302 and 301 are to be coded together as a PB-frame pair. The PB-frame pair is segmented into blocks and macroblocks for encoding by a modified encoder similar to the one shown in FIG. 2. Note that although PB-frames are supposedly coded together, the hierarchy of coding operations necessitates that a P-macroblock of picture 302 be coded first and then the B-blocks belonging to the co-located macroblock in picture 301 be coded next. Because the coding of picture 302 occurs on a macroblock basis before the coding of blocks of picture 301 occurs, and since, picture 301 can use bidirectional prediction, semantic constraints have been put in H.263 on the area of P-macroblock that can be used for prediction of B-blocks, as is illustrated more clearly in FIG. 4.

Figure 4:
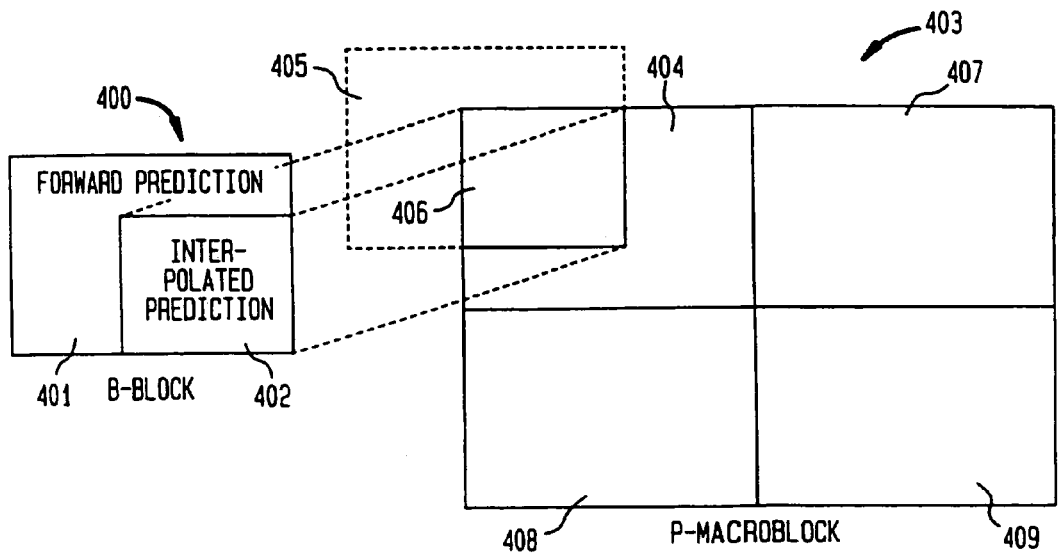
FIG. 4 shows details of the prediction of B-blocks using previous P-picture and P-macroblocks in accordance with the known H.263 standard.

FIG. 4 shows details of prediction of B-blocks of picture 301 using decoded picture 300 and decoded macroblocks of 302 for prediction. The B-block of 301 to be coded is shown as 400 and a co-located macroblock in picture 302 is shown as 403. The luminance component of macroblock 403 consists of blocks 404, 407,408, 409. The block 400, consists of two types of regions of pixels, one, that can be bidirectionally predicted without going outside of macroblock 403 (region, 402), and the other that cannot be predicted without going outside of macroblock 403 (region 401). Region 402 is coded bidirectionally using decoded picture 300 as well as region 406. Region 401 on the other hand is coded by forward prediction using decoded picture 300. It is worth clarifying that the prediction semantics just discussed although they could potentially save some storage, have adverse impact on quality and coding efficiency.

Figure 5:
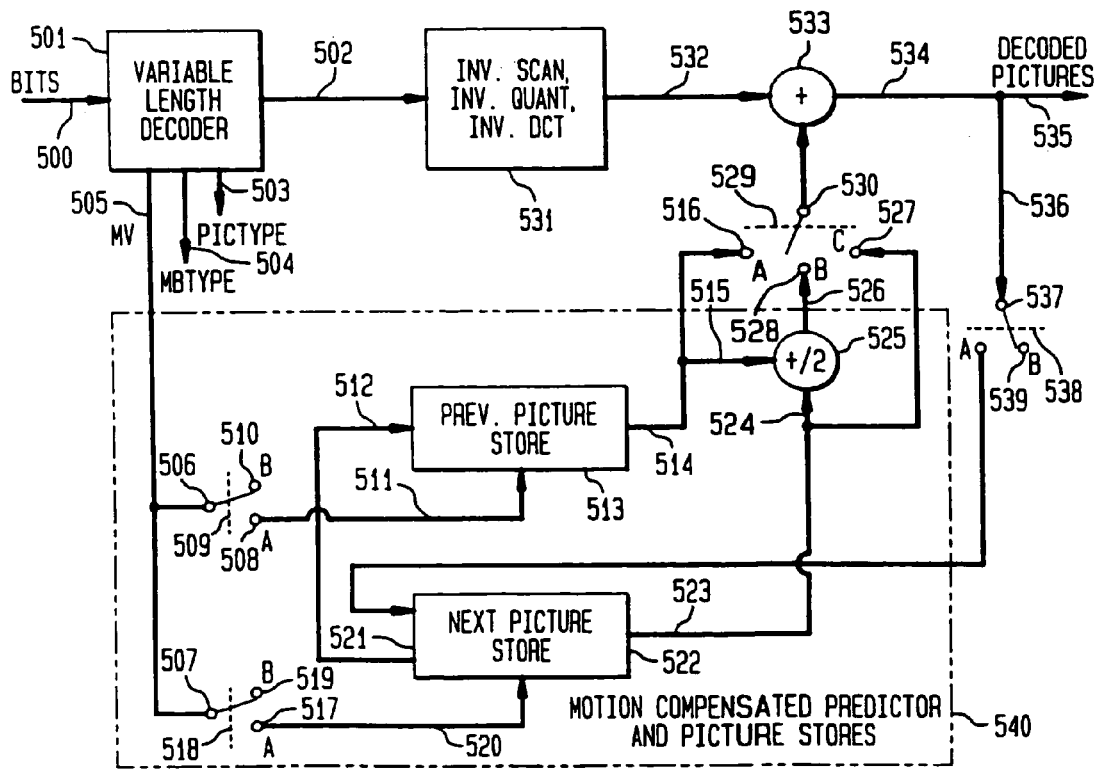
FIG. 5 shows a block diagram of a Motion Compensated DCT Decoder in accordance with the known MPEG-1 video standard.

FIG. 5 shows the block diagram of Motion Compensated DCT Decoder of the known MPEG-1 video standard, which performs the inverse operation of the Encoder discussed in FIG. 2. In particular, bitstream to be decoded is input on line 500 (this is the same bitstream generated at the output of encoding on line 241), and enters the Variable Length Decoder on line 501 (inverse of Variable Length Encoder 239) resulting in decoded DCT coefficients on line 502, pictype signal on line 503, mbtype signal on line 504 and motion vectors on line 505. The decoded motion vectors (mv) on line 505 are input via lines 506 and 507 via switches 508 and 518, respectively controlled by signals 509 and 518. In B-pictures, depending on the mbtype mode (forward prediction, backward prediction and interpolated prediction), either one of the switches 508 or 517 is in closed position or both are in closed position. For instance, if macroblock type implies forward prediction, control signal 509 places switch 508 to position 'A', likewise, if macroblock type implies backward prediction, control signal 518 places switch 517 into position 'A'. Further, when macroblock type implies interpolated prediction, both switches 508 and 517 are in respective positions 'A'. Thus appropriate motion vectors (forward, backward or both) needed for the chosen macroblock type are applied via lines 511 and 520 to Prev Picture Store, 513 and the Next Picture Store 522. Prior to coding of a B-picture, the previous decoded picture, if not a B-picture, available at output 535 passes via switch 537 (controlled by signal 538) to line 521 and is temporarily stored in Next Picture Store, 522, and copied right over to Prev Picture Store, 513. The P-picture following B-pictures to be coded, is coded next and is stored in the Next Picture Store, 522, following a similar path via lines 536, switch 537 and line 521. The output of picture stores is then made available on lines 514 and 523 and consists of predicted blocks (or macroblocks), depending on the type of macroblock being coded. Signal 529 controlling switch 528, connects either the forward prediction, line 515, the backward prediction, line 527 of the interpolated prediction, line 527 to line 530 which forms one of the two inputs to adder 533. The other input to the adder 533 is on line 532, which carries the decoded block obtained after Inv Scan, Inv Quant and Inv DCT in 531. Also, the interpolated prediction block on line 526 was in fact generated by averaging forward prediction block, line 525 and backward prediction block, line 524. The decoded picture is now available on line 534, at the output of adder 533. As a final note, the Motion Compensated Predictor and Picture Stores are identified by block 540.

Figure 6:
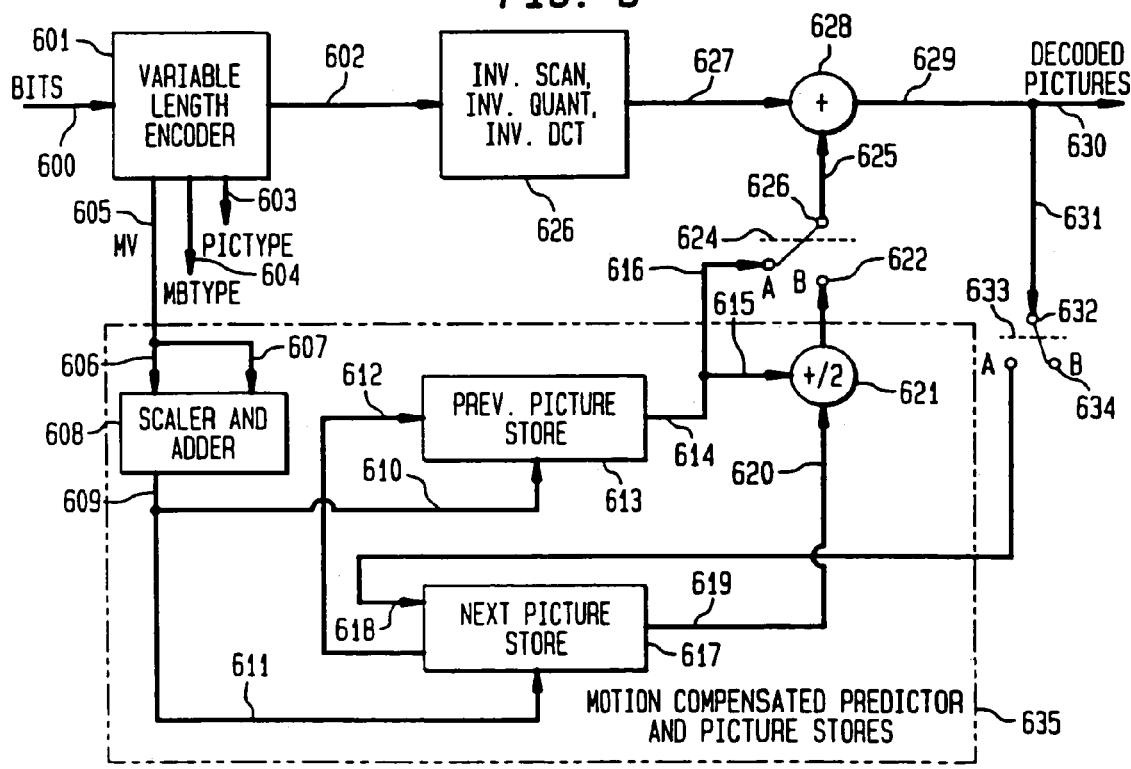
FIG. 6 shows a block diagram of a Motion Compensated DCT Decoder in accordance with the known H.263 standard.
Figure 11:
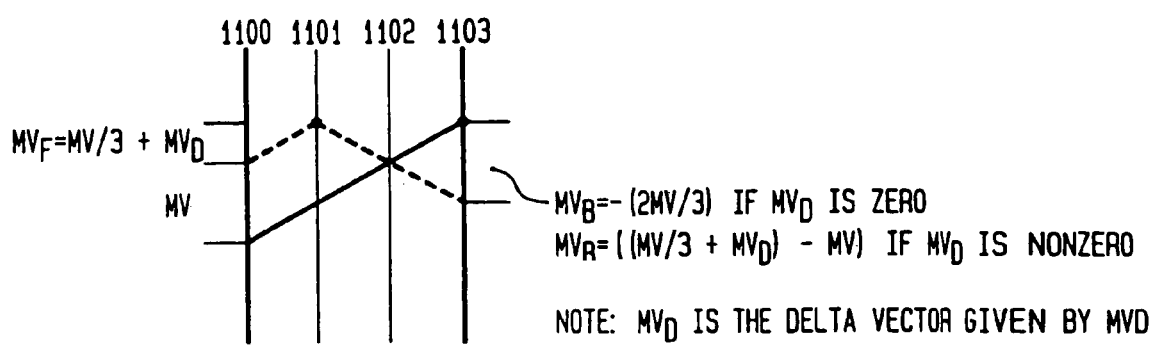
FIG. 11 shows an example illustrating the derivation of forward and backward motion vectors by the scaling of a single motion vector and the use of delta motion vectors in the direct mode of B-VOP coding in accordance with the invention.

FIG. 6 shows a block diagram of the Motion Compensated DCT Decoder in accordance with the known H.263 standard. The operation of this decoder is similar to that of the decoder shown in FIG. 5 except that it decodes PB-frames rather than the B-pictures. The bitstream to be decoded is input to decoder on line 600 and is forwarded to Variable Length Decoder 601, which outputs decoded DCT coefficients on line 602, pictype signal on line 603, mbtype signal on line 604 and motion vectors on line 605. In decoding in accordance with H.263, line 605 carries two type of motion vectors, first, the motion vectors between blocks (or macroblocks) of P-picture (picture 302 in FIG. 3) that forms part of the PB-frame 301 and 302 with respect to the previous decoded P-picture, 300, appear on line 606, and second, the delta motion vectors which are used for correction of errors introduced by scaling, which appear on line 607. Both lines 606 and 607 form an input to Scaler and Adder 608, which scales motion vector input on line 606 by a weighting factor proportional to its temporal distance and is compared to the temporal differences between the two P-frames 300 and 302 to form the approximate forward motion vector, which is then corrected by motion vector on line 607 to yield the exact forward prediction. The backward motion vector is also similarly computed (by scaling if the delta motion vector is zero or by subtracting the forward vector from total motion vector when delta motion vector is nonzero). Illustrative scaling rules are shown in FIG. 11. The calculated forward and backward motion vectors appear as output of 608 on line 609 such that the calculated forward vector is applied to Previous Picture Store 613, via line 610 and the calculated backward motion vector is applied to Next Picture Store 617, via line 611. The output of Previous Picture Store 613 is the forward prediction block on line 614 and the output of line 619 is the portion of the backward prediction block 406 on line 620 and the two predictions on lines 615 and 620 are averaged in adder 621, resulting in interpolated prediction on line 622. Next, under the control of signal 624, switch 626 allows forward prediction to be selected for portion of block 401 and interpolated prediction for remaining portion of block 402, the complete predicted block is output on line 625, which provides one input to adder 628, the other input of which is line 627, which corresponds to the output of Inverse Scan, Inverse Quantization and Inverse DCT 626. The decoded pictures appear on line 629 and are output on line 630 and (if not B-pictures) pass through line 631, switch 632, and line 618 to Next Picture Store, 617, and are immediately transferred to Prev. Picture Store 613 which contains the previously decoded P-picture. To clarify, the Next Picture Store 617, carries the decoded P-picture of the PB-frame, and in fact, may build up to entire picture as macroblocks get processed, one at a time. Finally, Motion Compensated Predictor and Picture Stores are identified by block, 635.

Figure 7:
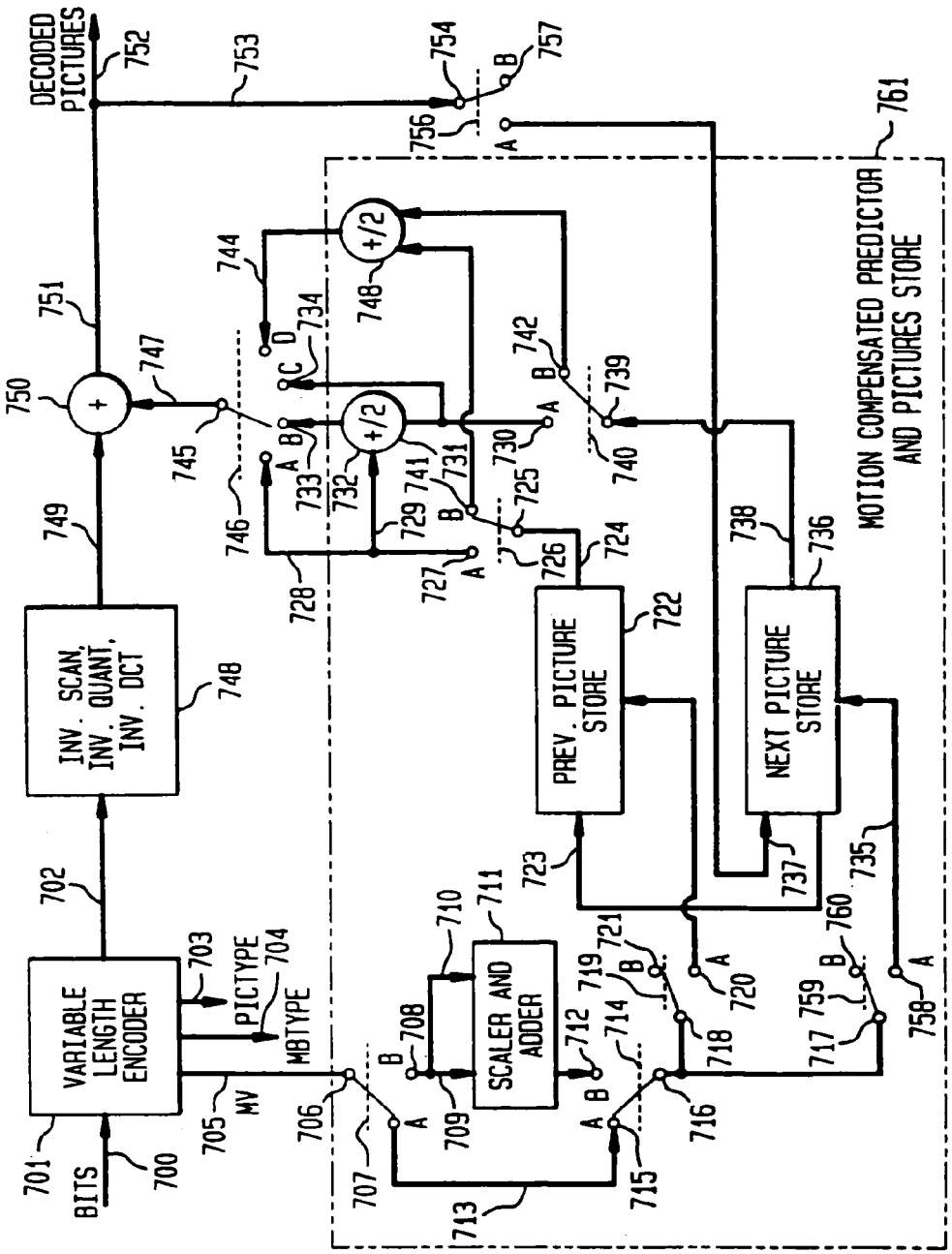
FIG. 7 shows a block diagram of a Motion Compensated DCT Decoder with improved B-pictures in accordance with the present invention.

FIG. 7 shows a block diagram of the Motion Compensated DCT Decoder in accordance with the invention. The coded bitstream on line 700 enters the Variable Length Decoder, 701, resulting in decoded (run, level) coefficient pairs on line 702, pictype signal on line 703, mbtype signal on line 704 and motion vectors on line 705. The motion vectors (mv) carried on line 705 are either the direct motion vectors (which can be stored next P-picture block/macroblock motion vector and delta motion vector), forward motion vector, backward motion vector, or both forward and backward motion vectors. Switch 706, controlled by signal 707, when in position 'B' allows direct motion vectors to be applied to Scaler and Adder 711 via lines 708 such that the next P-picture block/macroblock motion vector is applied on line 709 and delta correction motion vector on line 710. Alternatively, switch 706 can be placed in the 'A' position connecting to line 713. The output of Scaler and Adder 711 are scaled (implicit forward and backward) motion vectors corrected for scaling errors and form one input to switch 714, the other input to which are normal forward and/or backward motion vectors. The switch 714 is controlled by a control signal 715 and when in position 'A' allows normal forward and/or backward motion vectors to be applied to Prev and Next Picture Stores 722 and 733 via switches 718 and 758, which are controlled by respective signals 719 and 759. The switches 718 and 758 are needed to allow, depending on the macroblock type, the forward motion vector, the backward motion vector, or both motion vectors to pass through to lines 720 and 735. When switch 714 is in position 'B', the implicit forward and backward motion vectors are applied to lines 720 and 735 respectively, also via switches 718 and 758, which are both assumed to now be in position 'A' under the control of signals 719 and 759. Regardless of whether actual forward and backward motion vectors or the implicit ones, the output of 722 and 736 provide prediction blocks on lines 724 and 738 respectively. Switches 725 and 739 under the control of signals 726 and 740 guide the prediction blocks obtained by application of actual forward and backward motion vectors to Picture Stores 722 and 736, to lines 727 and 730. The prediction block on line 730 is also applied to an averager 732, the other input of which is line 729, which carries the same signal as that on line 728. The three predictions, forward, backward and interpolated predictions become available on lines 728, 734 and 733, respectively, which form the input to switch 745, which has yet another input on line 744 and corresponds to the direct prediction generated in averager 743 in response to inputs 741 and 742, which are prediction blocks generated by application of implicit forward and backward motion vectors to respective Pictures Stores, 722 and 736. Switch 745 is controlled by control signal 746 which, depending on decoded macroblock type, sets the switch to one of the four positions, 'A', 'B', 'C' or 'D'. The resulting prediction block is now available on line 747 which forms an input to the adder 750, the other input of which is the output of block 748 on line 749 carrying decoded prediction error signal. The decoded blocks are generated at output of 750 on line 751 and the decoded picture is output on line 752. Also, the decoded picture, if it is not a B-picture, is stored for future prediction in Next Picture Store, 736 via lines 753 and 737 and a switch 754 (controlled by signal 756). The picture in Next Picture store 736, when appropriate, is shifted to Prev. Picture Store 722, making room for storing a new decoded picture to be used for prediction.

Figure 8:
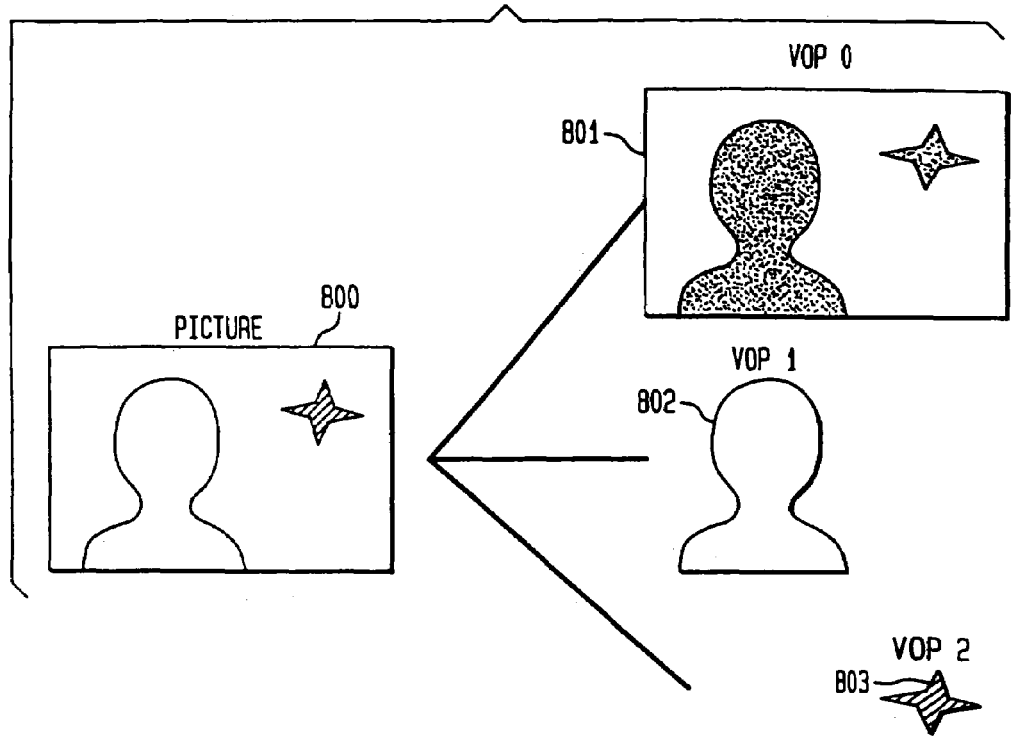
FIG. 8 shows an example of a picture segmented into VOPs in accordance with the known VM2.1 of the MPEG-4 standards.

FIG. 8 shows an example of a Picture segmented into VOPs in accordance with the known VM2.1 of the MPEG-4 standard. For example, picture 800 is segmented into a number of semantic objects/regions of arbitrary shape, head and shoulders view 802, a logo 803, and the background without the foreground objects 801. These semantic objects/regions within a picture are called Video Object Planes (VOPs). Thus, there are three VOPs, VOP1 (802), VOP2 (803) and VOP0 (801). In VM2.1 of the MPEG-4 video coding, each of these VOPs can be coded as intra (I-) or with temporal prediction (P-) and are therefore called I- or P-VOPs. VM2.1 coding involves partitioning a VOP into maroblocks and coding of blocks in the macroblock by DCT based video coding.

Figure 9:
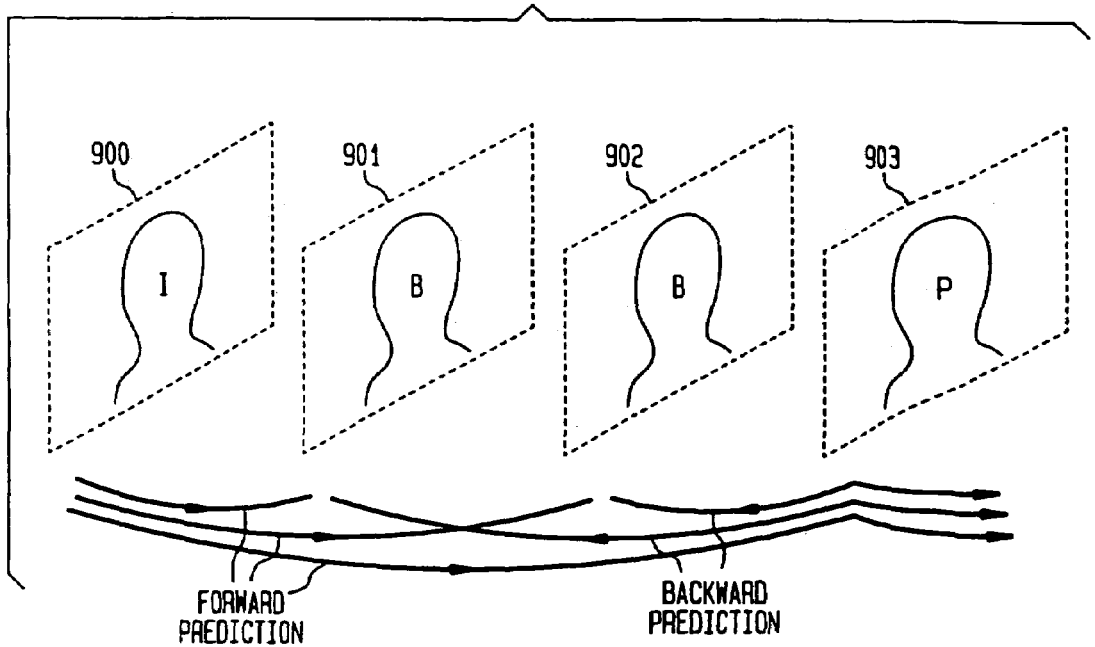
FIG. 9 shows an example of a VOP structure using I- and P-VOPs (in accordance with the known VM2.1 of the MPEG-4 video standards), and B-VOPs in accordance with the present invention.

FIG. 9 shows an example of a VOP structure using I- and P-VOPs (in accordance with the known VM2.1 of the MPEG-4 standard), and B-VOPs in accordance with the invention. Efficient coding of VOP1 (802) can be performed by coding each temporal occurrence of this VOP with prediction. For instance, the first temporal occurrence of VOP1, 900, is coded intra (I-) and the third temporal occurrence of VOP1, 903, is coded productively (P-) with respect to 900. The two intermediate temporal occurrence of the VOP, 901 and 902 are coded bidirectionally using decoded VOPs 900 and 903. As discussed earlier, the temporal occurrences of VOP1, 900, 901, 902 and 903 can be rectangular or of arbitrary shape.

Figure 10:
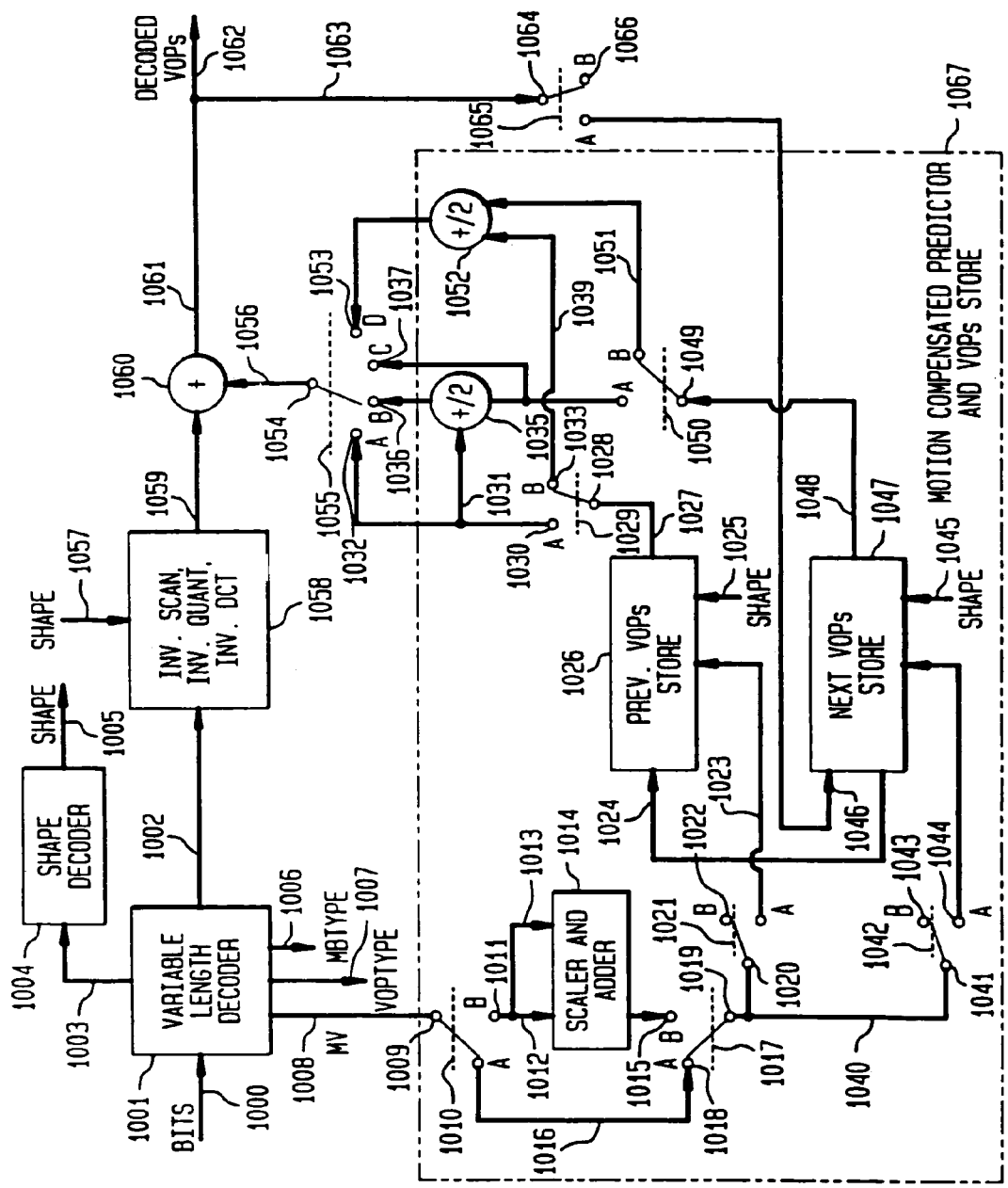
FIG. 10 shows a block diagram of a Motion Compensated DCT Decoder with B-VOPs, in accordance with the present invention.

FIG. 10 shows a block diagram of Motion Compensated DCT Decoder with B-VOPs, in accordance with the present invention. The operation of this decoder is similar to the decoder shown in FIG. 7, except for the differences discussed below. First of all, instead of pictures, VOP's are decoded. This means that instead of picture stores 722 and 736, we now have VOP stores, 1026 and 1047. Further, instead of pictype indication signal 703, voptype indication signal 1007 is used. Another difference is that since VOPs can have an arbitrary shape, a shape decoder 1001 is needed, which provides information regarding the exact shape of the object/regions. The decoded shape information is available on line 1005 and is used by Inv. Scan, Inv. Quant and Inv. DCT block 1058. The decoded shape information is also used by Prev. VOP Store 1026, and Next VOP Store 1047, and is applied to them on lines 1025 and 1045 respectively; thus ensuring that only the needed decoded blocks are stored in VOPs store 1026 and 1047 and are used for generating various prediction modes on a block/macroblock basis.

FIG. 11 shows an example illustrating the derivation of forward and backward motion vectors by the scaling of a single motion vector and the use of delta motion vectors in the direct mode of the B-VOP coding in accordance with the invention. Each of the VOPs 1100 and 1103 is either a P-VOP or an I-VOP. In normal coding, if VOP 1100 is the first VOP, it is assumed to be an I-VOP and the next predicted VOP, 1103 is a P-VOP. VOPs 1101 and 1102 are bidirectionally predicted using decoded VOPs 1100 and 1103 as references.

The following discussion describes exemplary syntax and semantics which allows the B-VOPs of the present invention to be incorporated into H.263+ and the MPEG-4 video standards.

Syntax and Semantics

VOP Layer:

With introduction of the B-VOP concept, the VOP_prediction_type can now be either I, P or B. The only syntax element that needs to be introduced is the one used to calculate the global quantizer for the B-VOP in relation to quantizer of the already decoded P-VOP which temporally follows the B-VOP.

if (VOP_prediction_type=='B') {
DBQUANT 2
}

VOP_prediction_type:

This code indicates the prediction mode to be used for a VOP. TABLE 1 shows the allowed values.

TABLE 1

VOP prediction types

| VOP_prediction_type | Code |
|---|---|
| I | 00 |
| P | 01 |
| B | 10 |

DBQUANT:

DBQUANT is present if VOP_prediction_type indicates 'B-VOP'. The meaning of DBQUANT and the codewords employed are the same that in H.263. QUANT ranges from 1 to 31. DBQUANT is a 2 bit fixed length code that indicates the relationship between QUANT and BQUANT. In this table "/" means truncation. Depending in the value of DBQUANT, BQUANT is calculated according to the relationship shown in TABLE 2 and is clipped to lie in the range 1 to 31.

TABLE 2

DBQUANT codes and relation between QUANT and BQUANT

| DBQUANT | BQUANT |
|---|---|
| 00 | (5 × QUANT)/4 |
| 01 | (6 × QUANT)/4 |
| 10 | (7 × QUANT)/4 |
| 11 | (8 × QUANT)/4 |

Macroblock Layer:

Data for each macroblock consists of a macroblock header followed by data for blocks. The macroblock layer structure in I or P VOPs is shown in TABLE 3A. COD is only present in VOPs for which VOP_prediction_type is 'P'. MCBPC is present when indicated by COD or when VOP_prediction_type indicates I-VOP. CBPY, DQUANT, MVD and $MVD_{2-4}$ are present when indicated by MCBPC. Block Data is present when indicated by MCBPC and CBPY. $MVD_{2-4}$ are only present in Advanced Prediction mode.

TABLE 3A

Structure of macroblock layer in I and P VOPs

| CO | MCB | CBP | DQUA | MV | MV | MV | MV | Block |
|---|---|---|---|---|---|---|---|---|

The macroblock layer structure in B VOPs is shown in TABLE 3B. MODB is present for every macroblock in B-VOP. MVD's ($MVD_f$, $MVD_b$, or MVDB) and CBPB are present if indicated by MODB. The presence of MBTYPE is deduced from presence of MVD's and CBPB. DQUANT is present only when indicated by MBTYPE.

TABLE 3B

Structure of macroblock layer in B VOPs

| MOD | MBTY | CBP | D'QUAN | MV | MV | MV | Block |
|---|---|---|---|---|---|---|---|

Coded Macroblock Indication (COD) (1 Bit):
The meaning of COD bit is same as that in the VM2.1.

Macroblock Type & Coded Block Pattern for Chrominance (MCBPC) (Variable Length):

The meaning of MCBPC and the codewords employed are same as that in the VM2.1.

Coded Block Pattern for Luminance (CBPY) (Variable Length):
The meaning of CBPY and the codewords employed are the same as that in the VM2.1.

Quantizer Information (DQUANT) (2 Bits):
The meaning of DQUANT and the codewords employed are the same as that in the VM2.1.

Motion Vector Data (MVD) (Variable Length):
The meaning of MVD and the codewords employed are same as that in the VM2.1.

Motion Vector Data ($MVD_{2-4}$) (Variable Length)
The meaning of $MVD_{2-4}$ and the codewords employed are same as that in the VM2.1.

Macroblock Mode for B-Blocks (MODB) (Variable Length):

MODB is present only in macroblocks belonging to B-VOPs. The meaning of this codeword is same as that in H.263 and is repeated here mainly for clarity. MODB is present for every macroblock in a B-VOP. It is a variable length codeword indicating whether any MVDs ($MVD_f$, $MVD_b$, or MVDB) and/or CBPB is present. The codewords for MODB are defined in TABLE 4.

TABLE 4

VLC table for MODB

| Index | CBPB | Any MVDs | Number of bits | Code |
|---|---|---|---|---|
| 0 |  |  | 1 | 0 |
| 1 |  | X | 2 | 10 |
| 2 | X | X | 2 | 11 |

Note: "x" means that the item is present in the macroblock

Macroblock Tape (MBTYPE) (Variable Length):

MBTYPE is present only in macroblocks belonging to B-VOPs. Furthermore, it is present only in those macroblock where either any MVD or both any MVD and CBPB are sent as indicated by MODB. MBTYPE indicates the type of macroblock coding used, for example, H.263 like motion compensation or MPEG-1 like motion compensation with forward, backward or interpolated, or change of quantizer by use of DQUANT. The codewords for MBTYPE are defined in TABLE 5.

TABLE 5

MBTYPES and included data elements in B-VOPs

| Index | MBTYPE | DQUANT | $MVD_f$ | $MVD_b$ | MVDB | Number of bits | Code |
|---|---|---|---|---|---|---|---|
| 0 | Direct (H.263B) |  |  |  | X | 1 | 1 |
| 1 | Interpolate MC + Q | X | X | X |  | 2 | 01 |
| 2 | Backward MC + Q | X |  | X |  | 3 | 001 |
| 3 | Forward MC + Q | X | X |  |  | 4 | 0001 |

Note: "X" means that the item is present in the macroblock

Rather than refer to each MBTYPE by an index or by its long explanation in terms of MC mode and Quantizer information, we refer to them as a coding mode which means the following.

Direct Coding (Direct MC, no new Q)
    Interpolated Coding (Interpolate MC+Q)
    Backward Coding (Backward MC+Q)
    Forward Coding (Forward MC+Q)

Coded Block Pattern for B-Blocks (CBPB) (6 Bits):

CBPB is only present in B-VOPs if indicated by MODB. $CBPB_N=1$ if any coefficient is present for B-block N, else 0, for each bit $CBPB_N$ in the coded block pattern. The numbering of blocks has been shown earlier, the utmost left bit of CBPB corresponds to block number 1.

Quantizer Information for B-Macroblocks (DQUANT) (2 Bits):

The meaning of DQUANT and the codewords employed are the same as that in the VM for DQUANT in I- or P-VOPs. The computed quantizer is scaled by a factor depending on the selected global quantizer scale for B-VOP's, DBQUANT.

Motion Vector Data for Forward Prediction ($MVD_f$) (Variable Length):

$MVD_f$ is the motion vector of a macroblock in B-VOP with respect to temporally previous reference VOP (an I- or a P-VOP). It consists of a variable length codeword for the horizontal component followed by a variable length codeword for the vertical component. The variable length codes employed are the same ones as used for MVD and $MVD_{2-4}$, for P-VOPs in the VM.

Motion Vector Data for Backward Prediction ($MVD_b$) (Variable Length):

$MVD_b$ is the motion vector of a macroblock in B-VOP with respect to temporally following reference VOP (an I- or a P-VOP). It consists of a variable length codeword for the horizontal component followed by a variable length codeword for the vertical component. The variable length codes employed are the same ones as used for MVD and $MVD_{2-4}$ for P-VOPs in the VM.

Motion Vector Data for Direct Prediction (MVDB) (Variable Length)

MVDB is only present in B-VOPs mode if indicated by MODB and MBTYPE and consists of a variable length codeword for the horizontal component followed by a variable length codeword for the vertical component of each vector. MVDBs represents delta vectors that are used to correct B-VOP macroblock motion vectors which are obtained by scaling P-VOP macroblock motion vectors. The variable length codes employed are the same ones as used for MVD and $MVD_{2-4}$ for P-VOPs in the VM.

Block Layer

A macroblock structure comprises of four luminance blocks and one of each of the two colour difference blocks. The same structure is used for all types of VOPs, I, P or B. Presently intra macroblocks are supported both in I- and P-VOPs. For such macroblocks, INTRADC is present for every block of each macroblock and TCOEF is present if indicated by MCBPC or CBPY. For nonintra macroblocks of P-VOPs, TCOEF is present if indicated by MCBPC or CBPY. For B-VOP macroblocks, TCOEF is present if indicated by CBPB. TABLE 6 shows a generalized block layer for all type of VOPs.

TABLE 6

Structure of block layer

| INTRA | TCOE |
|---|---|

Coding Details of B-VOPs

Macroblocks in B-VOPs can be coded either using H.263 like B-block coding or by MPEG-1 like B-picture macroblock coding. The main difference is in the amount of motion vector and quantization related overhead needed. The MBTYPE with H.263 like B-block coding is referred to as direct prediction, besides which, the forward, the backward and the interpolated prediction modes of MPEG-1 B-pictures are supported.

Direct Coding:

This coding mode uses direct (interpolated) motion compensation derived by extending H.263 approach of employing P-picture macroblock motion vectors and scaling them to derive forward and backward motion vectors for macroblocks in B-picture. This is the only mode which makes it possible to use motion vectors on 8×8 blocks, of course, this is only possible when the co-located macroblock in the following P-VOP uses 8×8 MV mode. As per H.263, PB-frame syntax only one delta motion vector is allowed per macroblock. FIG. 11 shows an example of motion vectors and their scaling employed.

The first extension of the H.263 approach is that bidirectional predictions can be made for a full block/macroblock rather then only a portion of the block/macroblock due to restrictions on prediction area in PB-frames. The second extension of H.263 is that instead of allowing interpolation of only one intervening frame, more than one frames can be interpolated. Of course, if the prediction is poor due to fast motion or large interframe distance, other motion compensation modes can be chosen.

Calculation of Vectors:

The calculation of forward and backward motion vectors involves linear scaling of the co-located block in temporally next P-VOP, followed by correction by a delta vector, and is thus similar to the procedure followed in H.263. The main change is that here we are dealing with VOPs instead of pictures, and instead of only a single B-picture between a pair of reference pictures, multiple B-VOPs are allowed between a pair of reference VOPs. As in H.263, the temporal reference of the B-VOP relative to difference in the temporal reference of the pair of reference VOPs is used to determine scale factors for computing motion vectors which are corrected by the delta vector.

The forward and the backward motion vectors are $MV_F$ and $MV_B$ and are given in half pixel units as follows.

$$MV_F = (TR_B \times MV)/TR_D + MV_D$$

$$MV_B = ((TR_B - TR_D) \times MV)/TR_D \text{ if MV is equal to } 0$$

$$MV_B = MV_F - MV \text{ if MV is not equal to } 0$$

Where MV is the direct motion vector of a macroblock in P-VOP with respect to a reference VOP, $TR_B$ is the temporal reference of the B-VOP being coded and $TR_D$ is the difference in temporal reference of the temporally next reference VOP with temporally previous reference VOP, assuming B-VOPs or skipped VOPs in between.

Generating Prediction Block:

The process of generating a prediction block consists of using computed forward and backward motion vectors to obtain appropriate blocks from reference VOPs and averaging these blocks. Irrespective of whether the direct prediction motion vectors are derived by scaling of a single motion vector or four 8×8 motion vectors per block, motion compensation is performed individually on 8×8 blocks to generate a macroblock. In case for a macroblock only a single motion vector was available to compute direct prediction motion vector, it is simply repeated for each of the 8×8 blocks forming the macroblock. The main difference with H.263 is that there are no constraints in the amount of region within a block that can be bidirectionally predicted; i.e., the entire macroblock can be interpolatively predicted.

The direct coding mode does not allow quantizer change and thus the quantizer value for previous coded macroblock is used.

Forward Coding:

Forward coding mode uses forward motion compensation in the same manner as in MPEG-1/2 with the difference that a VOP is used for prediction instead of a picture. Only one motion vector in half pel units is employed for a 16×16 macroblock being coded. Chrominance vectors are derived by scaling of luminance vectors as in MPEG-1/2.

This coding mode also allows switching of quantizer from the one previously in use. Specification of DQUANT, a differential quantizer involves a 2-bit overhead as discussed earlier.

Backward Coding:

Backward coding mode uses backward motion compensation in the same manner as in MPEG-1/2 with the difference that a VOP is used for prediction instead of a picture. Only one motion vector in half pel units is employed for a 16×16 macroblock being coded. Chrominance vectors are derived by scaling of luminance vectors as in MPEG-1/2.

This coding mode also allows switching of quantizer from the one previously in use. Specification of DQUANT, a differential quantizer involves a 2-bit overhead as discussed earlier.

Interpolated Coding:

Interpolated coding mode uses interpolated motion compensation in the same manner as in MPEG-1/2 with the difference that a VOP is used for prediction instead of a picture. Two motion vectors in half pel units are employed for a 16×16 macroblock being coded. Chrominance vectors are derived by scaling of luminance vectors as in MPEG-1/2.

This coding mode also allows switching of quantizer from the one previously in use. Specification of DQUANT, a differential quantizer involves a 2-bit overhead as discussed earlier.

Mode Decisions:

Since, in B-VOPs, a macroblock can be coded in one of the four modes, we have to decide which mode is the best. At the encoder, motion compensated prediction is calculated by each of the four modes. Next, using each of the motion compensated prediction macroblocks mean square error (MSE) is computed between it and the macroblock to be coded.

The general guideline is to use the mode providing least MSE while requiring fewest bits for motion vectors. Since, it is a little difficult to apriori measure cost of motion vector coding, the strategy is to select least MSE after indirectly factoring in motion vector cost in terms of a threshold. Direct prediction is preferred if it produces MSE equal to or slightly higher (within a threshold) as compared to other modes. Forward or backward prediction is preferred next. Bidirectional prediction is only preferred if it produces much lower MSE as compared to other modes. The exact thresholds for mode decisions are to be chosen based on experimentation.

Motion Vector Range and Coding:

Motion vectors are to be coded differentially. The differential motion vector coding method is same as that in MPEG-1/2. All predictions are reset at the left edge of VOP. Depending on the macroblock type either one or both predictors may be updated, the predictors that are not updated are carried through. For macroblocks coded in direct bidirectional prediction mode, the forward and backward motion vector computed for block prediction are to be used as forward and backward motion vector predictors.

The invention claimed is:

1. An encoded bitstream having data for predicting an intermediate block in a received B-VOP, the encoded bitstream comprising:
   a motion vector associated with a future block of a temporally next reference VOP, the future block spatially coincident with an intermediate block in a received B-VOP;
   a temporally next reference VOP used by a decoder to:
      determine a first predicting block using a forward scaling of the received motion vector;
      determine a second predicting block in the temporally next reference VOP using a backward scaling of the received motion vector; and
      predict the content of the intermediate block based on the first predicting block and the second predicting block.

2. The encoded bitstream of claim 1, wherein the forward scaling is performed according to the equation:

$$MVF=(TRB \times MV)/TRD+MVD,$$

wherein TRB is the difference in temporal reference of the B-VOP and the previous reference VOP, TRD is the difference in temporal reference of the temporally next reference VOP with temporally previous reference VOP, MV is the received motion vector; MVD is a received correction motion vector and MVF is the scaled forward motion vector.

3. The encoded bitstream of claim 1, wherein the backward scaling is performed according to the equations:

$$MVB=((TRB-TRD) \times MV)/TRD, \text{ if MVD is equal to zero, or}$$

$$MVB=(MVF-MV), \text{ if MVD is not equal to zero,}$$

wherein TRB is the difference in temporal reference of the B-VOP and the previous reference VOP, TRD is the difference in temporal reference of the temporally next reference VOP with temporally previous reference VOP, MV is the received motion vector; MVD is a received correction motion vector and MVB is the scaled backward motion vector.

4. The encoded bitstream of claim 1, wherein the decoder predicts the content of the intermediate block by averaging the first predicting block and the second predicting block.

5. The encoded bitstream of claim 1, wherein the encoded bitstream further comprising:
   an indication of a prediction mode used to encode the intermediate block.

6. The encoded bitstream of claim 5, wherein the prediction mode is a direct prediction mode.

7. A computing device having a computer-readable memory medium storing executable instructions that when executed by a processor, cause the processor to:
- receive a motion vector associated with a future block of a temporally next reference VOP, the future block spatially coincident with an intermediate block in a B-VOP;
- determine a first predicting block in a temporally previous reference VOP using a forward scaling of the received motion vector;
- determine a second predicting block in the temporally next reference VOP using a backward scaling of the received motion vector; and
- predict the content of the intermediate block based on the first predicting block and the second predicting block.

8. The computing device of claim 7, wherein the executable instructions, when executed by the processor, further cause the processor to perform the forward scaling according to the equation:

$$MVF=(TRB \times MV)/TRD+MVD,$$

wherein TRB is the difference in temporal reference of the B-VOP and the previous reference VOP, TRD is the difference in temporal reference of the temporally next reference VOP with temporally previous reference VOP, MV is the received motion vector, MVD is a received correction motion vector and MVF is the scaled forward motion vector.

9. The computing device of claim 1, wherein the executable instructions, when executed by the processor, further cause the processor to perform the backward scaling according to the equation:

$$MVB=((TRB-TRD) \times MV)/TRD, \text{ if MVD is equal to zero, or}$$

$$MVB=(MVF-MV), \text{ if MVD is not equal to zero,}$$

wherein TRB is the difference in temporal reference of the B-VOP and the previous reference VOP, TRD is the difference in temporal reference of the temporally next reference VOP with temporally previous reference VOP, MV is the received motion vector, MVD is a received correction motion vector and MVB is the scaled backward motion vector.

10. The computing device of claim 1, wherein the executable instructions, when executed by the processor, further cause the processor to predict the content of the intermediate block by averaging the first predicting block and the second predicting block.

11. A computing device having a B-VOP intermediate block predictor apparatus, the predictor apparatus comprising:
- a decoder to receive an encoded bit stream and to decode a motion vector associated with a future block of a temporally next reference VOP, the future block spatially coincident with the intermediate block;
- means for determining a first predicting block in a temporally previous reference VOP using a forward scaling of the received motion vector;
- means for determining a second predicting block in the temporally next reference VOP using a backward scaling of the received motion vector; and
- means for predicting the content of the intermediate block based on the first predicting block and the second predicting block.

12. The computing device of claim 11, wherein the first circuit performs the forward scaling according to the equation:

$$MVF=(TRB \times MV)/TRD+MVD,$$

wherein TRB is the difference in temporal reference of the B-VOP and the previous reference VOP, TRD is the difference in temporal reference of the temporally next reference VOP with temporally previous reference VOP, MV is the received motion vector, MVD is a received correction motion vector and MVF is the scaled forward motion vector.

13. The computing device of claim 11, wherein the second circuit performs the backward scaling according to the equations:

$$MVB=((TRB-TRD) \times MV)/TRD, \text{ if MVD is equal to zero, or}$$

$$MVB=(MVF-MV), \text{ it MVD is not equal to zero,}$$

wherein TRB is the difference in temporal reference of the B-VOP and the previous reference VOP, TRD is the difference in temporal reference of the temporally next reference VOP with temporally previous reference VOP, MV is the received motion vector, MVD is a received correction motion vector and MVB is the scaled backward motion vector.

14. A computing device having a video decoder, the video decoder comprising:
- a forward mode predictor coupled to a source of coded VOP data;
- a backward mode predictor coupled to the source of coded VOP data;
- an interpolation mode predictor coupled to the source of coded VOP data; and
- a direct mode predictor coupled to the source of coded VOP data, the direct mode predictor comprising:
  - a first prediction circuit to predict data for a block in the first VOP from data in a first previously decoded VOP in a first temporal direction, the data in the first previously decoded VOP being identified by a first scaling of a motion vector associated with the first VOP;
  - a second prediction circuit to predict data for the block in the first VOP from data in a second previously decoded VOP in a second temporal direction, the data in the second previously decoded VOP being identified by a second scaling of the motion vector; and
  - a prediction output circuit to generate predicted data for the block in the first VOP based upon outputs from the first and second prediction circuits.

15. The computing device of claim 14, wherein the first and second scalings are given respectively by:

$$MVF=(TRB \times MV)/TRD+MVD, \text{ and}$$

$$MVB=(MVF-MV), \text{ where}$$

MV represents the motion vector, TRB represents a temporal difference between the first VOP and the first previously decoded VOP, TRD represents a temporal difference between the first and second previously decoded VOPs, MVD represents a correction motion vector associated with the first VOP, MVF represents a first scaling of the motion vector and MVB represents a second scaling of the motion vector.

16. The computing device of claim 14, wherein the direct predictor comprises a previous picture store and a future picture store, to store the first and second previously decoded VOPs.

17. A computing device having a video decoder, the video decoder comprising:
   a variable length decoder;
   a processing circuit, coupled to the variable length decoder, to inverse quantize and transform data output from the variable length decoder;
   an adder having a pair of inputs, one input coupled to an output of the processing circuit; and
   a predictor, comprising:
      a motion vector processor having an input for received motion vectors and an output for scaled motion vectors;
      first and second picture memories to store previously decoded video data, each responsive to input vector data by outputting addressed video data therein;
      a first switching system, coupled to the motion vector processor and the first and second picture memories, to selectively direct either the received motion vectors or the scaled motion vectors to the first and second picture memories as determined by a coding identification signal;
      an averager coupled to outputs of the first and second picture memories; and
      a second switching system selectively coupling the second input of the adder to one of the first picture memory, the second picture memory and the averager as determined by the coding identification signal.

18. The computing device of claim 17, wherein an output of the adder is coupled to the first picture memory and an output of the first picture memory is input to the second picture memory.

19. The computing device of claim 17, wherein the motion vector processor generates a scaled motion vector from a received motion vector according to:

$$MVF=(TRB \times MV)/TRD+MVD, \text{ and}$$

$$MVB=(MVF-MV), \text{ where}$$

MV represents the received motion vector, TRB represents a temporal difference between a currently decoded picture and a picture stored in the first picture memory, TRD represents a temporal difference between pictures stored in the first and second picture memories, MVD represents a correction motion vector associated with the first currently decoded picture, MVF represents a first scaling of the received motion vector and MVB represents a second scaling of the received motion vector.

20. The computing device of claim 17, wherein, when the coding identification signal indicates forward prediction, the first switching system couples the first picture memory to the received motion vectors and the second switching system couples the input of the adder to the first picture memory.

21. The computing device of claim 17, wherein, when the coding identification signal indicates backward prediction, the first switching system couples the second picture memory to the received motion vectors and the second switching system couples the input of the adder to the second picture memory.

22. The computing device of claim 17, wherein when the coding identification signal indicates interpolation prediction, the first switching system couples the first and second picture memories to the received motion vectors and the second switching system couples the input of the adder to the averager.

23. The computing device of claim 17, wherein, when the coding identification signal indicates direct prediction, the first switching system couples the first and second picture memories to the motion vector processor and the second switching system couples the input of the adder to the averager.

24. A computing device having a video decoder, the video decoder comprising:
   a variable length decoder;
   a processing circuit, coupled to the variable length decoder, to inverse quantize and transform data output from the variable length decoder;
   an adder having a pair of inputs, one input coupled to an output of the processing circuit; and
   a predictor, comprising:
      a motion vector processor, having an input for received motion vectors and an output for scaled motion vectors;
      first and second memories to store data of previously decoded video object planes (VOPs), each responsive to input vector data by outputting addressed video data therein;
      a first switching system, coupled to the motion vector processor and the first and second memories, to selectively direct either the received motion vectors or the scaled motion vectors to the first and second memories as determined by a coding identification signal;
      an averager coupled to outputs of the first and second memories; and
      a second switching system selectively coupling the second input of the adder to one of the first memory, the second memory and the averager as determined by the coding identification signal.

25. The computing device of claim 24, wherein an output of the adder is coupled to the first memory and an output of the first memory is input to the second memory.

26. The computing device of claim 24, wherein the motion vector processor generates a scaled motion vector from a received motion vector according to:

$$MVF=(TRB \times MV/TRD+MVD, \text{ and}$$

$$MVB=(MVF-MV), \text{ where}$$

MV represents the received motion vectors, TRB represents a temporal difference between a currently decoded VOP and a VOP stored in the first memory, TRD represents a temporal difference between VOPs stored in the first and second memories, MVD represents a correction motion vector associated with the first currently decoded VOP, MVF represents a first scaling of the received motion vector and MVB represents a second scaling of the received motion vector.

27. The computing device of claim 24, wherein, when the coding identification signal indicates forward prediction, the first switching system couples the first memory to the received motion vectors and the second switching system couples the input of the adder to the first memory.

28. The computing device of claim 24, wherein, when the coding identification signal indicates backward prediction, the first switching system couples the second memory to the received motion vectors and the second switching system couples the input of the adder to the second memory.

29. The computing device of claim 24, wherein, when the coding identification signal indicates interpolation prediction, the first switching system couples the first and second memories to the received motion vectors and the second switching system couples the input of the adder to the averager.

30. The computing device of claim 24, wherein, when the coding identification signal indicates direct prediction, the first switching system couples the first and second memories to the motion vector processor and the second switching system couples the input of the adder to the averager.

* * * * *

UNITED STATES PATENT AND TRADEMARK OFFICE
CERTIFICATE OF CORRECTION

| | | |
|---|---|---|
| PATENT NO. | : 7,356,081 B1 | |
| APPLICATION NO. | : 10/728658 | |
| DATED | : April 8, 2008 | |
| INVENTOR(S) | : Haskell et al. | |

It is certified that error appears in the above-identified patent and that said Letters Patent is hereby corrected as shown below:

Column 14, line 19, replace the word "received" with the word --derived--
Column 14, line 24, replace the word "received" with the word --derived--
Column 14, line 27, replace the word "received" with the word --derived--
Column 14, line 30, replace the word "received" with the word --derived--
Column 14, line 42, replace the word "received" with the word --derived--
Column 14, line 42, replace ";" with --,--
Column 14, line 43, replace the word "received" with the word --derived--
Column 14, line 56, replace the word "received" with the word --derived--
Column 14, line 56, replace ";" with --,--
Column 14, line 57, replace the word "received" with the word --derived--
Column 15, line 4, replace the word "receive" with the word --derive--
Column 15, line 9, replace the word "received" with the word --derived--
Column 15, line 13, replace the word "received" with the word --derived--
Column 15, line 27, replace the word "received" with the word --derived--
Column 15, line 28, replace the word "received" with the word --derived--
Column 15, line 43, replace the word "received" with the word --derived--
Column 15, line 44, replace the word "received" with the word --derive--
Column 15, line 54, replace the word "decode" with the word --derived--
Column 15, line 61, replace the word "received" with the word --derived--
Column 15, line 64, replace the word "received" with the word --derived--
Column 16, line 10, replace the word "received" with the word --derived--
Column 16, line 11, replace the word "received" with the word --derived--
Column 16, line 25, replace the word "received" with the word --derived--
Column 16, line 26, replace the word "received" with the word --derived--
Column 17, line 14, replace the word "received" with the word --derived--
Column 17, line 22, replace the word "received" with the word --derived--
Column 17, line 39, replace the word "received" with the word --derived--
Column 17, line 44, replace the word "received" with the word --derived--
Column 17, line 51, replace the word "received" with the word --derived--
Column 17, line 53, replace the word "received" with the word --derived--
Column 17, line 57, replace the word "received" with the word --derived--
Column 17, line 62, replace the word "received" with the word --derived--
Column 18, line 1, replace the word "received" with the word --derived--
Column 18, line 20, replace the word "received" with the word --derived--
Column 18, line 30, replace the word "received" with the word --derived--
Column 18, line 45, replace the word "received" with the word --derived--

UNITED STATES PATENT AND TRADEMARK OFFICE
CERTIFICATE OF CORRECTION

PATENT NO. : 7,356,081 B1
APPLICATION NO. : 10/728658
DATED : April 8, 2008
INVENTOR(S) : Haskell et al.

It is certified that error appears in the above-identified patent and that said Letters Patent is hereby corrected as shown below:

Column 18, line 46, the formula reading "MVF=(TRBxMV/TRD+MVD" should read --MVF=(TRBxMV)TRD+MVD--
Column 18, line 51, replace the word "received" with the word --derived--
Column 18, line 58, replace the word "received" with the word --derived--
Column 18, line 59, replace the word "received" with the word --derived--
Column 18, line 63, replace the word "received" with the word --derived--
Column 19, line 1, replace the word "received" with the word --derived--
Column 19, line 6, replace the word "received" with the word --derived--

Signed and Sealed this

Fourteenth Day of April, 2009

JOHN DOLL
*Acting Director of the United States Patent and Trademark Office*